April 27, 1954      J. R. GILMER      2,676,336

CAR BASSINET

Filed May 26, 1949

INVENTOR

James R. Gilmer

Patented Apr. 27, 1954

2,676,336

UNITED STATES PATENT OFFICE 2,676,336

CAR BASSINET

James R. Gilmer, Garland, Tex.

Application May 26, 1949, Serial No. 95,537

4 Claims. (Cl. 5—94)

This invention pertains to a car bassinet, and more specifically to a small size infant bed designed primarily for use in the front seat of an automobile.

Heretofore, when young babies or infants have been carried in automobiles, it has been customary for an attendant to either hold the baby in her arms, lay the baby on the seat beside her and hold one hand on the baby to prevent the baby from rolling off the seat, or using a car bassinet now in general use which must set in the back seat of the automobile. Each of these has its advantages. The attendant gets very tired holding the baby in her arms or lap for a long period of time. There is hardly enough room either lengthwise or crossways in the automobile seat to lay a baby which is over a few months old. Using a bassinet located on the back seat requires that the attendant ride in the back seat.

An object of my present invention, therefore, is to furnish a car bassinet which may be conveniently disposed lengthwise between two persons occupying the front seat of a car where the bassinet is easily accessible to either or both persons so that the bassinet is easily accessible to the driver if only the driver is occupying the front seat.

A second object of this invention is to provide a safe, comfortable device of the type described which prevents the infant from falling or rolling onto the floorboard of the car, which is comfortable to the infant since the infant may be laid in a horizontal position for resting or sleeping and which is comfortable for the infant's attendant since she does not have to carry or hold the infant.

A still further object of my invention is to provide a device which is simple but rugged in construction, efficient in use, and attractive in appearance.

With the above noted and other objects in view, my invention consists in certain novel features of construction and combinations and arrangements of parts, as will be more fully described in the claims. The invention may be more fully understood from the following description in connection with the accompanying drawings, wherein:

Figure 1:
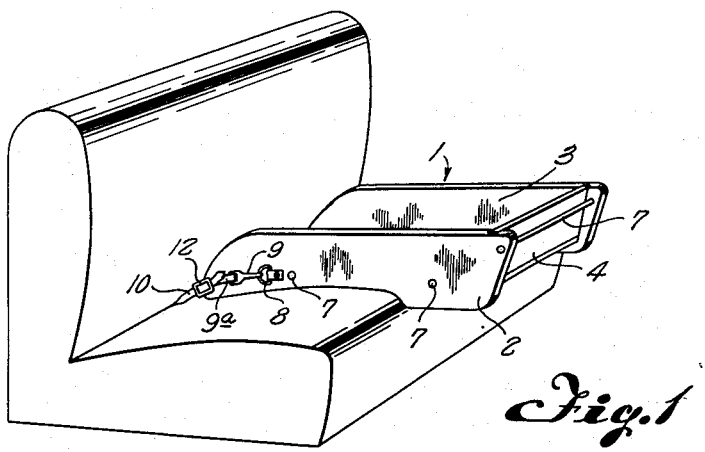
Figure 1 is a perspective view showing the manner in which my car bassinet rests upon the car seat, and also the general arrangement of all parts.
Figure 2:
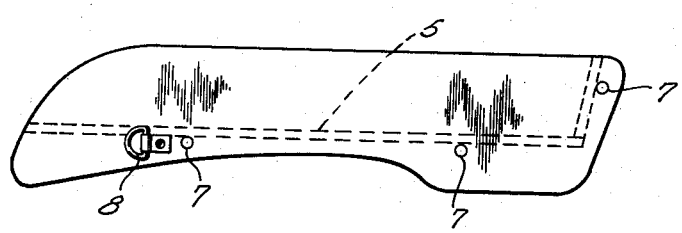
Figure 2 is a side view showing the position of the bottom and front with respect to the sides.
Figure 3:
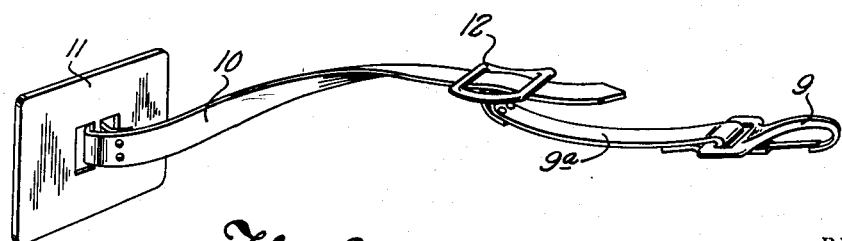
Figure 3 is a perspective view of the safety latch.

Referring now to the figures, my novel car bassinet 1 includes two sides 2 and 3, a front 4, and a bottom 5, which are made of any suitable light weight material such as wood, plastic or metal.

The lower edges of sides 2 and 3 are designed to fit the contour of the upper surface of the front seat cushion of an automobile. They extend from the front surface of the seat back to within a few inches of the dashboard of the automobile. The bottom 5 is so positioned between the sides 2 and 3 that it lies in a plane parallel to that of the floorboard. The baby who lies on the bottom 5 will thus be in a horizontal position whether he has his head pointed to the front or to the rear. The bottom 5 and front 4 fit into grooves in sides 2 and 3 and are held in contact with the sides by three rods 7. A D-ring 8 is hingedly secured to each of the sides 2 and 3 by metal strips attached to the sides 2 and 3. A snap 9 on one end of each belt 9a is detachably connected to each D-ring 8. A square plate 11 of any suitable material, such as aluminum or plastic, is connected to one end of each belt 10. The other end of each belt 10 is adjustably connected to the belt 9a by a buckle 12.

Installing and removing my novel car bassinet may be performed quickly and easily. To install the car bassinet, one of the plates 11 is laid in a flat position and pushed rearwardly through the slot or opening between the seat cushion and the seat back. It is then turned through an angle of 90 degrees or to such a position that it lies perpendicular to the opening through which it has passed. A pull forward on the belt 10 secures the plate 11 in position. The snap 9 is then connected to a D-ring 8 and the buckle 12 is adjusted until the belt length is such that the back of the car bassinet fits tightly against the back slot of the car seat. The other plate 11 is then positioned in the same manner and its associated snap 9 is connected to the other D-ring 8.

To remove the car bassinet, the snaps 9 on each side are removed from the D-rings and the bassinet alone is removed, the safety latch remaining in the seat.

A comfortable berth is thus provided for an infant permitting the infant to ride while asleep in the preferred position and in a preferred location. The infant is located in a place which is convenient to the driver, yet does not hinder two people from riding comfortably in the front seat.

In the foregoing, I have described my invention solely in connection with a specific preferred embodiment thereof. Since many variations and modifications of my invention should now be obvious to those skilled in the art, I desire to be bound not by the specific disclosure herein contained but only by the appended claims.

I claim:

1. A car bassinet comprising two sides whose lower portions are shaped to fit the contour of the upper surface of the seat cushion of the car seat, a front interposed between said sides, a bottom interposed between said sides, and a pair of anchoring latches, each of said anchoring latches comprising a snap which is connected to a D-ring located on each of said sides when said bassinet is installed in an automobile and which is unconnected from the D-ring when said bassinet is removed from the automobile, a plate, and an adjustable belt connecting said plate and said snap, one anchoring latch being on each side and extending through an opening between the seat back and the seat cushion of the car seat, said bassinet fitting longitudinally in the front seat of an automobile and being retained there by said anchoring latches.

2. An elongated bassinet for placement on a seat having an upstanding seat back and a seat cushion, said bassinet having an open top; anchor means adapted to be disposed to the rear of said seat cushion, each of said anchor means comprising a flat plate removably insertable between said seat back and said seat cushion to a position below said seat back and to the rear of and abutting said seat cushion; and a pair of flexible members extending between said seat back and said seat cushion when said bassinet is in position on said seat, said flexible members being attached to said anchor means and detachably secured to said bassinet to maintain said bassinet firmly in place on said seat, said bassinet extending longitudinally from said seat back when in position on said seat cushion.

3. In a bassinet for placement on a seat having an upstanding seat back and a seat cushion; a pair of spaced sides; a front member and a bottom member disposed between and secured to said sides, said sides having lower portions shaped to fit the contour of the upper surface of said seat cushion and maintain said bottom member in horizontal position; a pair of flat anchor members adapted to be removably disposed to the rear of said seat cushion to engage the rear end of said seat cushion; and a pair of flexible members, one of said flexible members connecting one of said anchor members to one of said sides and the other of said flexible members connecting the other of said anchor members to the other of said sides to maintain said bassinet firmly in place on said seat.

4. In a bassinet for placement on a seat having an upstanding seat back and a seat cushion; a pair of spaced sides; a front member and a bottom member disposed between and secured to said sides, said sides having lower portions shaped to fit the contour of the upper surface of the seat cushion and maintain said bottom member in horizontal position; a pair of flat anchor means adapted to be removably disposed to the rear of said seat cushion to engage the rear end of said seat cushion; and a pair of flexible members, one of said flexible members connecting one of said anchor means to one of said sides and the other of said flexible members connecting the other of said anchor means to the other of said sides to maintain said bassinet firmly in place on said seat, said sides extending perpendicularly from said seat back with said front member being disposed remote from said seat back.

References Cited in the file of this patent

UNITED STATES PATENTS

| Number | Name | Date |
|--------|------|------|
| 1,397,281 | Haas | Nov. 15, 1921 |
| 1,543,142 | Woods | June 23, 1925 |
| 1,693,633 | Allen | Dec. 4, 1928 |
| 1,887,810 | Hughes | Nov. 15, 1932 |
| 2,308,315 | Smith | Jan. 12, 1943 |
| 2,433,504 | Zimmerman | Dec. 30, 1947 |

FOREIGN PATENTS

| Number | Country | Date |
|--------|---------|------|
| 303,798 | Germany | May 30, 1917 |